(12) United States Patent
Russell et al.

(10) Patent No.: US 6,266,597 B1
(45) Date of Patent: Jul. 24, 2001

(54) VEHICLE AND ENGINE CONTROL SYSTEM AND METHOD

(75) Inventors: John David Russell, Farmington Hills; Allan Joseph Kotwicki, Williamsburg, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/416,433

(22) Filed: Oct. 12, 1999

(51) Int. Cl.$^7$ ........................................... G06F 7/00
(52) U.S. Cl. ............................... 701/54; 701/64; 477/107
(58) Field of Search ................................ 701/51, 54, 58, 701/64; 477/34, 101, 107, 109, 115, 116, 120

(56) References Cited

U.S. PATENT DOCUMENTS 4,480,503 * 11/1984 Ahlen et al. .

4,819,596 * 4/1989 Yasuoka et al. .

FOREIGN PATENT DOCUMENTS

4321413 A1    1/1995 (DE) .

* cited by examiner

*Primary Examiner*—William A. Cuchlinski, Jr.
*Assistant Examiner*—Edward Pipala
(74) *Attorney, Agent, or Firm*—John D. Russell (57) ABSTRACT

An engine control system controls engine torque to transition through the transmission lash zone. The transmission lash zone is determined using speed ratio across the torque converter. When near the transmission lash zone, engine torque is adjusted at a predetermined rate until the system passes through the transmission lash zone. By limiting the change of torque in this way, driveability is improved and it is possible to quickly and reliably provide negative engine torque for braking.

25 Claims, 5 Drawing Sheets

VEHICLE AND ENGINE CONTROL SYSTEM AND METHOD

FIELD OF THE INVENTION

The present invention relates to a system and method to control an internal combustion engine coupled to a torque converter and in particular to adjusting engine output to improve drive feel.

BACKGROUND OF THE INVENTION

Internal combustion engines must be controlled in many different ways to provide acceptable driving comfort during all operating conditions. Some methods use engine output, or torque, control where the actual engine torque is controlled to a desired engine torque through an output adjusting device, such as with an electronic throttle, ignition timing, or various other devices. In some cases, such as during normal driving conditions, the desired engine torque is calculated from the amount of depression of an accelerator pedal. In other conditions, such as idle speed control, the desired engine torque is calculated based on a speed error between actual engine speed and a desired engine speed. Some attempts have been made to use this torque control architecture to improve driveability during deceleration conditions, such as when a driver releases their foot to the minimum accelerator pedal position, known to those skilled in the art as a tip-out. During a tip-out, the driver is indicating a desire for reduced engine output.

One system that attempts to use speed control during deceleration conditions operates the engine in such a way as to maintain constant engine speed during slow moving or stopped conditions. In this system, the engine is controlled to a constant speed taking into account the loading from the torque converter. The loading from the torque converter is calculated based on the engine speed and turbine speed. Engine speed can be controlled to a constant level during deceleration to adsorb energy from the vehicle and assists in vehicle braking. Further, as turbine speed increases, the desired engine speed is reduced to provide even more engine braking. Such a system is described in DE 4321413A1.

The inventors herein have recognized a disadvantage with the above approach. In particular, when the accelerator pedal is released and subsequently engaged, the prior art system exhibits poor driveability due transmission gears lash. For example, when the engine transitions from exerting a positive torque to exerting a negative torque (or being driven), the gears in the transmission separate at the zero torque transition point. Then, after passing through the zero torque point, the gears again make contact to transfer torque. This series of events produces an impact, or clunk, resulting in poor driveability and customer dissatisfaction. In other words, the engine first exerts a positive torque through the torque converter onto the transmission input gears to drive the vehicle. Then, when using the prior art approach during deceleration, the engine is driven by the torque from the transmission through the torque converter. The transition between these to modes is the point where the engine is producing exactly zero engine brake torque. Then, at this transition point, the gears in the transmission separate because of inevitable transmission gear lash. When the gears again make contact, they do so dynamically resulting in an undesirable impact.

This disadvantage of the prior art is exacerbated when the operator returns the accelerator pedal to a depressed position, indicating a desire for increased engine torque. In this situation, the zero torque transition point must again be traversed. However, in this situation, the engine is producing a larger amount of torque than during deceleration because the driver is requesting acceleration. Thus, another, more severe, impact is experienced due to the transmission lash during the zero torque transition.

SUMMARY OF THE INVENTION

An object is to provide a method for determining when the vehicle is operating in or near the transmission lash zone.

The above object is achieved and disadvantages of prior approaches overcome by a method for estimating when a vehicle is near a transmission lash zone, the vehicle having an internal combustion engine coupled to a transmission via a torque converter having a speed ratio from torque converter output speed to torque converter input speed, the method comprising the steps of: indicating when the speed ratio is within a predetermined range; and determining that the vehicle is near the transmission lash zone in response to said indication.

An advantage of the present invention is that it is possible to make other engine control features aware that the vehicle is operating in a region where transmission gear separation may occur. Thus, other engine control features can take action to minimize effects of transmission gear separation.

In another aspect of the present invention, an object is to provide an engine output control system for easing transitions through the transmission lash zone.

The above object is achieved, and problems of prior approaches overcome, by a vehicle control method for a vehicle having an internal combustion engine coupled to a torque converter, the torque converter having a speed ratio from torque converter output speed to torque converter input speed, the torque converter coupled to a transmission, the method comprising the steps of: indicating when the speed ratio is within a predetermined range; and in response to said indication, adjusting an operating parameter to control a change in an engine output to be less than a preselected value.

By using signals already available it is possible to provide a real-time estimate of the transmission lash zone, or zero torque point. With this information, it is then possible to transition through the transmission lash zone gently by controlling engine output so that "clunk" is minimized and fuel economy and emissions are optimized. In other words, the present invention utilizes the torque converter characteristics in the following way. Because these measurements are readily available, adjusting engine output according to the present invention near the transmission lash zone allows much improved drive feel since the effects of gear separation are minimized. Further, by using turbine speed and engine speed, effects from road grade, vehicle mass, temperature, and other factors are inherently considered without complexity or addition computation.

An advantage of the above aspect of the invention is improved driveability.

Another advantage of the above aspect of the invention is improved customer satisfaction.

Yet another advantage of the above aspect of the invention is improved fuel economy.

In yet another aspect of the present invention, the above objects are achieved and disadvantages of prior approaches overcome by a control method for a vehicle having an internal combustion engine coupled to a transmission via a torque converter having an input speed and an output speed, the method comprising the steps of: determining a speed ratio across the torque converter based on said input speed and said output speed; and controlling an engine operating parameter at a preselected rate when said speed ratio is within a predetermined range.

By controlling an operating parameter in this way, it is possible to gently pass through the transmission lash zone, thereby improving driver comfort.

An advantage of the above aspect of the present invention is improved drive comfort as a results of less severe transmission gear separation.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DESCRIPTION OF AN EMBODIMENT

Figure 1:
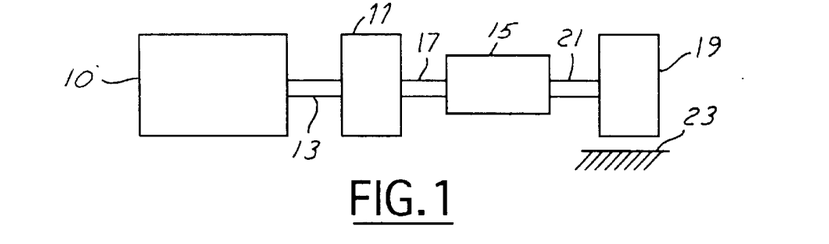
FIG. 1 is a block diagram of a vehicle illustrating various components related to the present invention.
Figure 2:
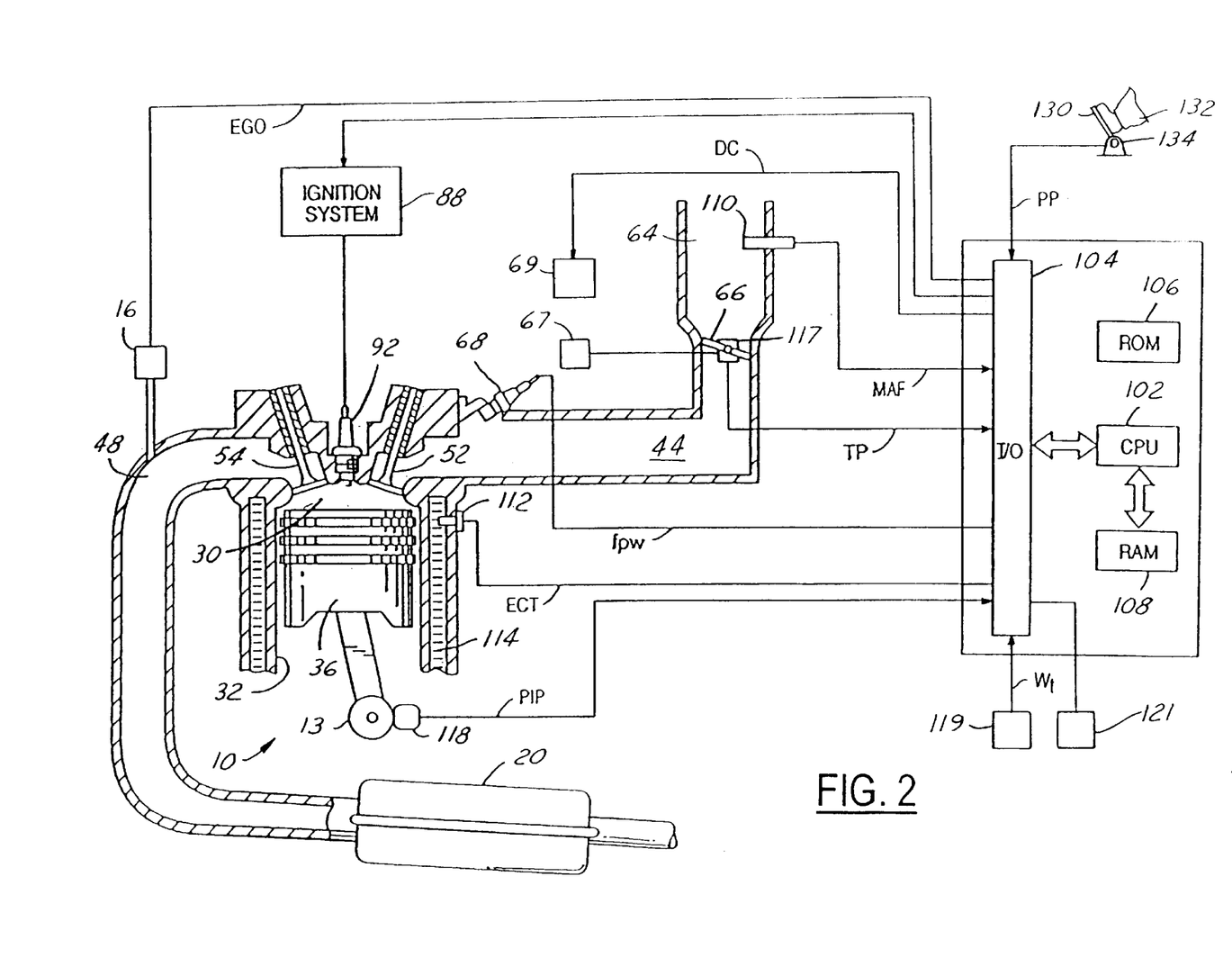
FIG. 2 is a block diagram of an engine in which the invention is used to advantage.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or partially engaged, the torque converter is said to be in an unlocked state. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23.

Internal combustion engine 10 comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 3:
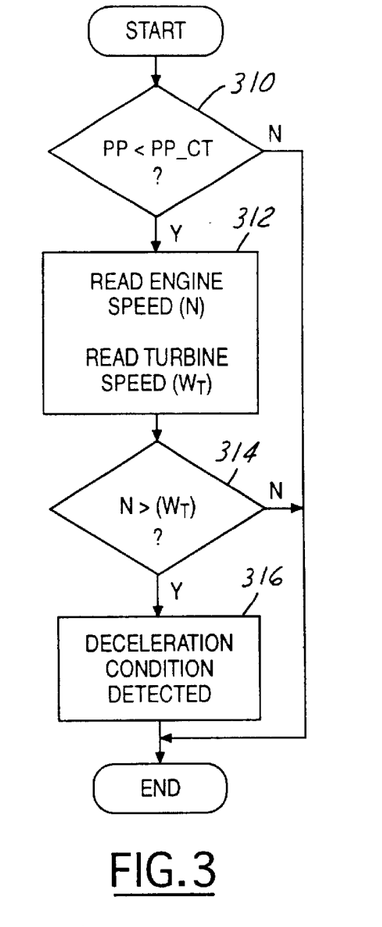
FIGS. 3–6 are high level flowcharts of various routines for controlling the engine according to the present invention.

Referring now to FIG. 3, a routine for detecting deceleration conditions is described. First, in step 310, driver actuated pedal position (PP) is compared with calibratable item (PP_CT), which represents the pedal position at which the pedal is closed. In an alternate embodiment, calibratable item (PP_CT) represents the pedal position below which a tip-out is indicated.

Alternatively, driver desired wheel torque, which is known to those skilled in the art to be a function of pedal position and vehicle speed, can be compared with a minimum desired wheel torque clip below which deceleration is desired. When the answer to step 310 is YES, then in step 312, both engine speed (N) and turbine speed (Wt) are read. In step 314, a determination is made as to whether engine speed is greater than turbine speed. When the answer to step 314 is YES, then deceleration conditions have been detected as shown in step 316.

Figure 4:
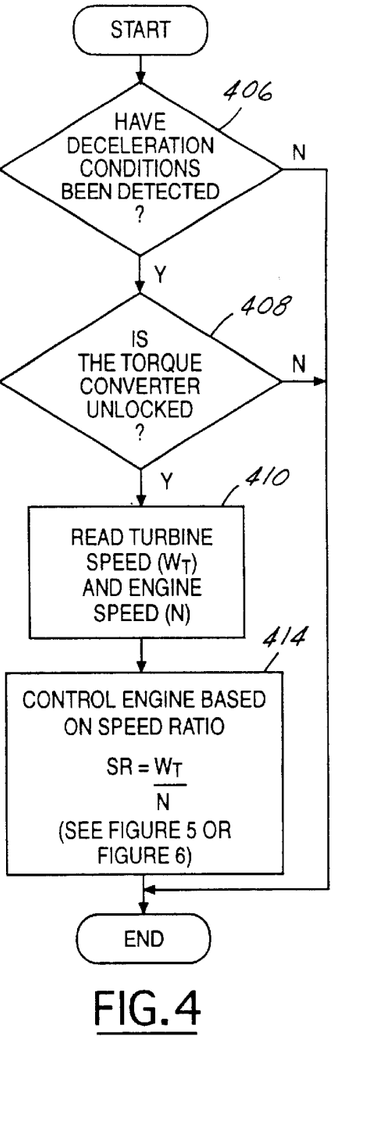

Referring now to FIG. 4, a routine for calculating a desired engine speed during deceleration conditions is described. First, in step 406, a determination is made as to whether deceleration conditions have been detected. When the answer to step 406 is YES, a determination is made in step 408 as to whether the torque converter is in and unlocked state. When the answer to step 408 is YES, engine speed (N) is read and turbine speed (Wt) is read from turbine speed sensor 119 in step 410. Then, in step 414 the engine is controlled based on a speed ratio, SR as described later herein with particular reference to FIG. 5. Speed ratio is determined as (SR=Wt/N) based on the turbine speed and engine speed. In other words, in this example, torque converter input speed is engine speed and torque converter output speed is turbine speed. These speed may determined in various other ways, such as, for example, turbine speed can be determine from gear ratio and vehicle speed. Also note that the speed ratio may also be determined as (SRalt= N/Wt). Those skilled in the art will recognized that the present invention can be suitably reduced to practice in view of this disclosure using the speed ratio calculated in either way.

Figure 5:
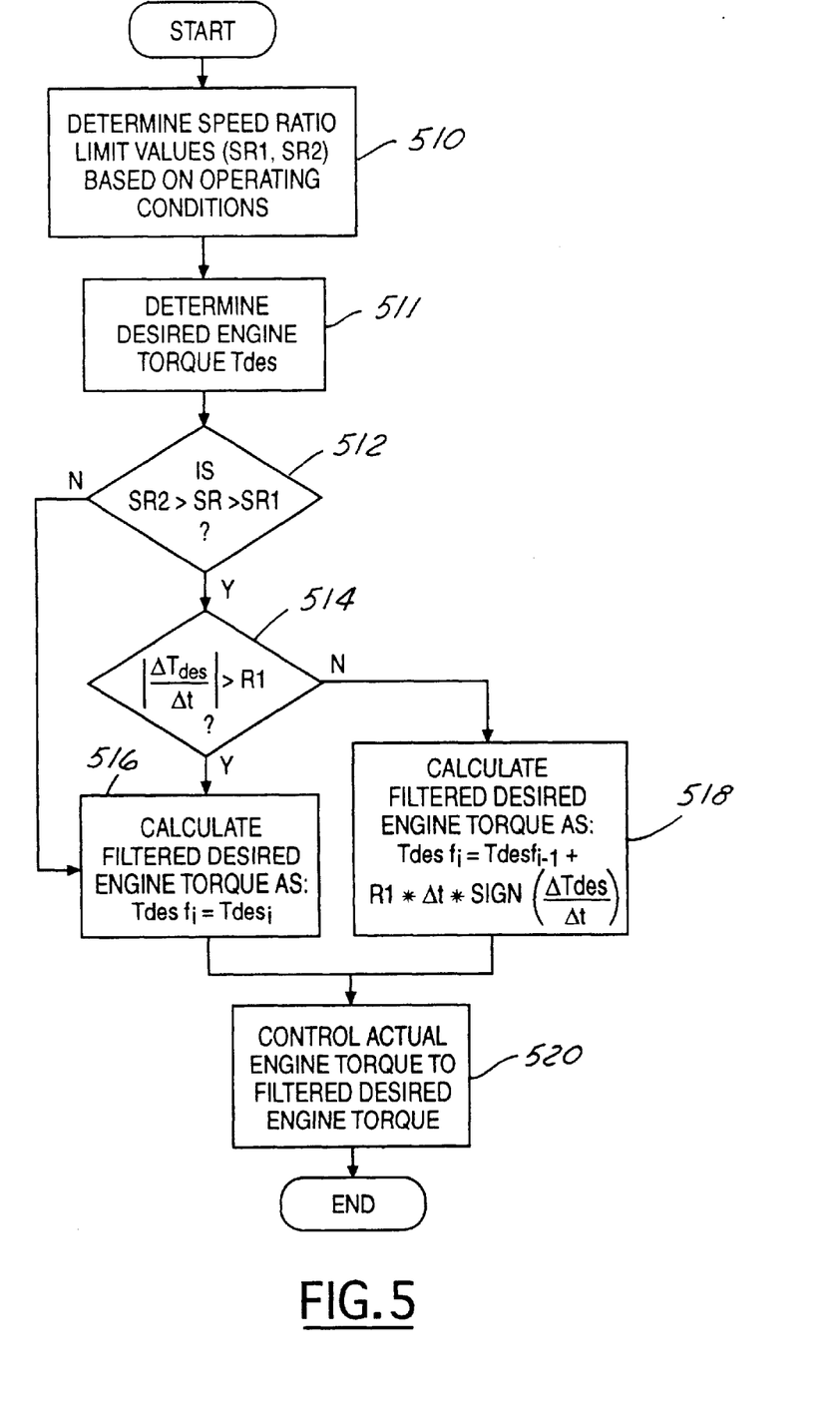

Referring now to FIG. 5, a routine for controlling an engine output, engine torque in this case, is described. First, in step 510, speed ratio limit values (SR1, SR2) are determined based on engine operating conditions. In a preferred embodiment, these values are calculated based on vehicle speed and gear ratio using calibration functions. However, various other signals may be used. These limit values (SR1, SR2) represent the upper and lower speed ratio values between which engine torque change is limited. In other words, according to the present invention, limit values (SR1, SR2) represent the upper and lower speed ratio values between which the zero torque transition, or transmission lash zone transition, occurs.

Continuing with FIG. 5, in step 511, a desired engine torque (Tdes) is determined using methods known to those skilled in the art. For example, desired engine torque may be determined based on a driver command, traction control, idle speed control, or various other methods. Also, desired engine torque can be either a desired indicated engine torque, or a desired engine brake torque. Then, in step 512, a determination is made as to whether speed ratio (SR) is within limit values (SR1, SR2). When the answer to step 512 is YES, then the engine torque change is limited as now described and it is determined that the vehicle is operating near the transmission lash zone, or zero torque point. In step 514, a determination is made as to whether desired engine torque change is greater than change limit R1. In particular, a determination is made as to whether the absolute value of desired engine torque change is greater than change limit R1. Change limit R1 is determined based on engine operating conditions such as, for example, engine speed, turbine speed, vehicle speed, gear ratio, or other variables. In a preferred embodiment, Change limit R1 is determined based on vehicle speed using a calibrated function. Also in a preferred embodiment, a rate of change of desired engine torque is determined based on current desired engine torque (Tdes$_i$), previous filtered desired engine torque (Tdesf$_{i-1}$) and sample time (Dt) as:

$$\frac{\Delta Tdes}{\Delta t} = \frac{Tdes_i - Tdesf_{i-1}}{t_i - t_{i-1}}$$

When, the answer to step 514 is YES, in step 516, current filtered desired engine torque (Tdesf$_i$) is set equal to current desired engine torque (Tdes$_i$). Otherwise, in step 518, current filtered desired engine torque (Tdesf$_i$) is calculated based on previous filtered desired engine torque (Tdesf$_{,i-1}$) and change limit R1 as:

$$Tdesf_i = Tdesf_{i-1} + R1 * \Delta t * \text{sgn}\left(\frac{\Delta Tdes}{\Delta t}\right).$$

The function (sgn) is known to those skilled in the art as the sign function, which produces a positive unity value when the parameter $$\left(\frac{\Delta Tdes}{\Delta t}\right)$$

is positive, and a negative unity when the parameter $$\left(\frac{\Delta Tdes}{\Delta t}\right)$$

is negative. Then, from either step 516 or 518, in step 520, actual engine torque is controlled to filtered desired engine torque (Tdesf$_i$). Those skilled in the art will recognize various methods of controlling actual engine torque to a desired value, such as, for example, by adjusting throttle position, adjusting airflow, adjusting exhaust gas recirculation, adjusting ignition timing, adjusting cam timing, or adjusting fuel injection amount.

Those skilled in the art will recognize various other methods, in view of this disclosure, for limiting an engine output change. According to the present invention, any method can be used for limiting the engine output change while in or near the transmission lash zone without departing from the spirit and scope of the invention. For example, in an alternate embodiment, engine speed change can be limited while in or near the transmission lash zone.

Those skilled in the art will also recognize various other methods, in view of this disclosure, for filtering a parameter. For example, low pass filters, notch filters, and various other filters can be used to limit the amount of change of a parameter. In other words, desired engine torque can be low pass filtered when speed ratio (SR) is within limits (SR1, SR2).

Figure 6:
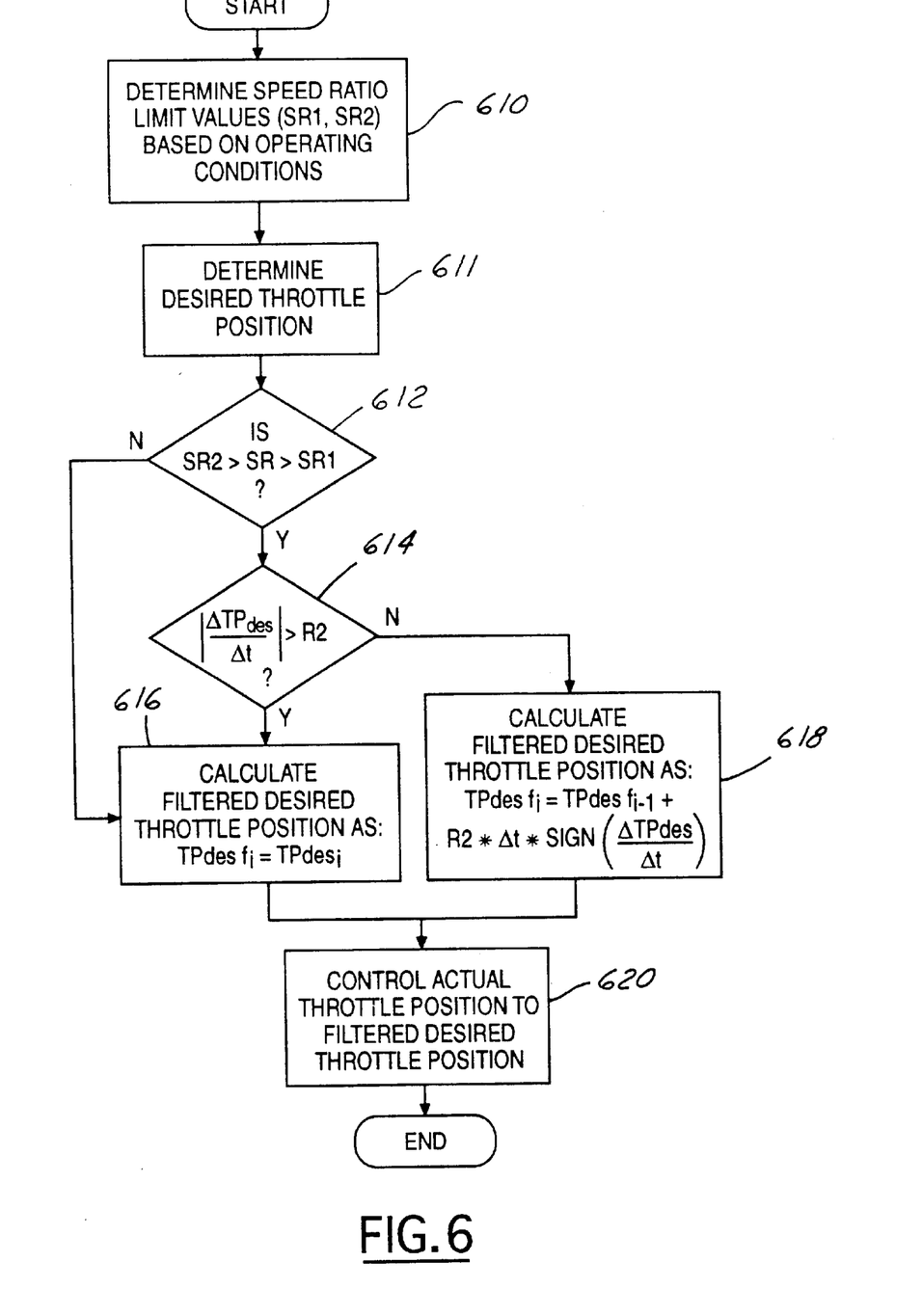

In an alternative embodiment, an engine control parameter, such as a throttle position, may be substituted for engine torque as described in FIG. 6. Referring now to FIG. 6, in step 610, speed ratio limit values (SR1, SR2) are determined based on engine operating conditions. Then, in step 611, a desired throttle position (TPdes) is determined using methods known to those skilled in the art. For example, desired throttle position may be determined based on a driver command, traction control, idle speed control, or various other methods. Then, in step 612, a determination is made as to whether speed ratio (SR) is within limit values (SR1, SR2). When the answer to step 612 is YES, then the throttle position change is limited as now described. In step 614, a determination is made as to whether desired throttle position change is greater than change limit R2. Change limit R2 is determined based on engine operating conditions such as, for example, engine speed, turbine speed, vehicle speed, gear ratio, or other variables. In a preferred embodiment, Change limit R2 is determined based on vehicle speed using a calibrated function. Also in a preferred embodiment, a rate of change of desired throttle position is determined based on current desired throttle position (TPdes$_i$) and previous filtered desired throttle position (TPdesf$_{i-1}$) as:

$$\frac{\Delta TPdes}{\Delta t} = \frac{TPdes_i - TPdesf_{i-1}}{t_i - t_{i-1}}.$$

When, the answer to step 614 is YES, in step 616, current filtered desired throttle position (TPdesf$_i$) is set equal to current desired throttle position (TPdes$_i$). Otherwise, in step 618, current filtered desired throttle position (TPdesf$_i$) is calculated based on previous filtered desired throttle position (TPdesf$_{i-1}$) and change limit R2 as:

$$TPdesf_i = TPdesf_{i-1} + R2 * \Delta t * \mathrm{sgn}\left(\frac{\Delta TPdes}{\Delta t}\right).$$

Then, from either step 616 or 618, in step 620, actual throttle position is controlled to filtered desired throttle position (TPdesf$_i$). Those skilled in the art will recognize various methods of controlling actual throttle position to a desired value, such as, for example, by using a controller based on a throttle position error signal.

Figure 7A:
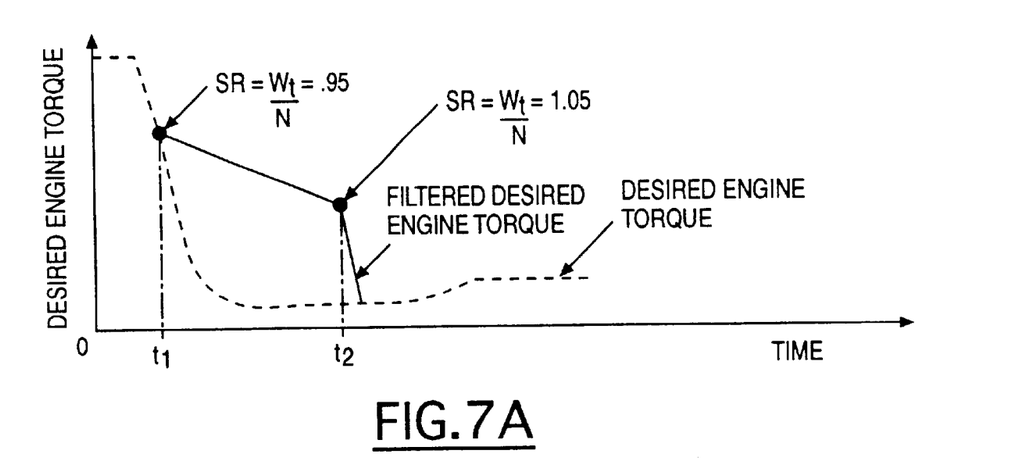
FIGS. 7A, 7B are a graphs of an example of operation according to the present invention.
Figure 7B:
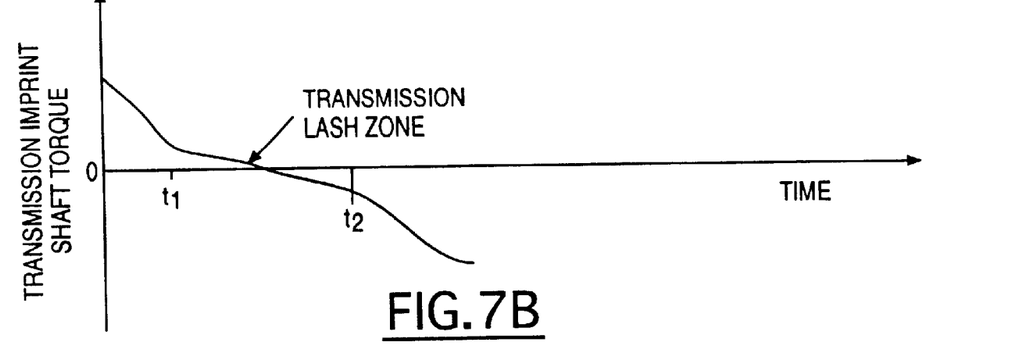

Referring now to FIGS. 7A and 7B, these graphs shows an example of operation according to the present invention. In this example, upper and lower limit values are set to (SR2=1.05, SR1=0.95). FIG. 7A shows desired engine torque on the vertical axis and time on the horizontal axis. The dashed line shows desired engine torque and the solid line shows the filtered desired engine torque according to the present invention. At time t2, the speed ratio reaches limit value SR1. From this point, the desired engine torque is limited to change at a maximum rate of R1. Then, the speed ratio reaches limit value SR2 at time t2 and the filtered desired engine torque again equals the desired engine torque. FIG. 7B shows the corresponding transmission input shaft torque (which is equal to torque converter output shaft torque). As transmission input shaft torque passes through zero torque, or the transmission lash zone, torque is changing slow than it would otherwise be, and transmission gear separation effects are minimized.

FIGS. 7A and 7B have shown an example of operation according to the present invention for tip-out conditions. However, those skilled in the art will recognize that the present invention as described can also be used to advantage during tip-in maneuvers, tip-out maneuvers, or both.

In addition to the above control methods, other features can be performed. In particular, when at a speed ratio of substantially one, controller 12 has determined that the engine drivetrain is producing substantially zero torque, as long as the torque converter is unlocked. Thus, if torque sensor 121 has a tendency to drift, it can be re-zeroed in response to an indication that the drivetrain is producing substantially zero torque.

This concludes the description of the Preferred Embodiment. The reading of it by those skilled in the art would bring to mind many other alterations and modifications without departing from the spirit and scope of the invention. For example, if turbine speed is not measured, vehicle speed and gear ratio can be substituted without loss of function. Accordingly, it is intended that the scope of the invention be limited by the following claims.

We claim:

1. A method for estimating when a vehicle is near a transmission lash zone, the vehicle having an internal combustion engine coupled to a transmission via a torque converter having a speed ratio from torque converter output speed to torque converter input speed, the method comprising the steps of:

indicating when the speed ratio is within a predetermined range; and determining that the vehicle is near the transmission lash zone in response to said indication.

2. The method recited in claim 1 wherein said predetermined range is between a lower limit value and an upper limit value, each based on engine operating conditions.

3. The method recited in claim 1 further comprising the step of controlling a change in engine output to be less than a preselected value.

4. The method recited in claim 1 further comprising the step of resetting a torque sensor zero in response to said determination.

5. A vehicle control method for a vehicle having an internal combustion engine coupled to a torque converter, the torque converter having a speed ratio from torque converter output speed to torque converter input speed, the torque converter coupled to a transmission, the method comprising the steps of:

indicating when the speed ratio is within a predetermined range; and in response to said indication, adjusting an operating parameter to control a change in an engine output to be less than a preselected value.

6. The method recited in claim 5 wherein speed ratio is determined by dividing the torque converter output speed by the torque converter input speed.

7. The method recited in claim 5 wherein speed ratio is determined by dividing the torque converter output speed by engine speed.

8. The method recited in claim 6 wherein said predetermined range is between a lower limit value and an upper limit value.

9. The method recited in claim 5 wherein speed ratio is determined by dividing the torque converter input speed by the torque converter output speed.

10. The method recited in claim 9 wherein said predetermined range is between a lower limit value and an upper limit value.

11. The method recited in claim 5 wherein said preselected value is based on an engine operating condition.

12. The method recited in claim 5 wherein said predetermined range is based on an engine operating condition.

13. The method recited in claim 5 wherein said engine output is an engine torque.

14. The method recited in claim 5 wherein said operating parameter is a throttle.

15. The method recited in claim 5 wherein said operating parameter is a fuel injection amount.

16. The method recited in claim 5 wherein said engine output is an engine speed.

17. The method recited in claim 12 wherein said engine operating condition is a vehicle speed.

18. A control method for a vehicle having an internal combustion engine coupled to a transmission via a torque converter having an input speed and an output speed, the method comprising the steps of:

determining a speed ratio across the torque converter based on said input speed and said output speed; and controlling an engine operating parameter at a preselected rate when said speed ratio is within a predetermined range.

19. The method recited in claim 18 wherein said operating parameter is a throttle position.

20. The method recited in claim 18 wherein said operating parameter is an engine torque.

21. The method recited in claim 19 wherein said predetermined range is between a lower limit value and an upper limit value.

22. The method recited in claim 21 wherein said preselected rate is based on an operating condition.

23. The method recited in claim 22 wherein said controlling step further comprises controlling said operating parameter at said preselected rate when said speed ratio is within said predetermined range and when a driver actuated element position is less than a predetermined position.

24. An article of manufacture comprising:

a computer storage medium having a computer program encoded therein for controlling a vehicle having an internal combustion engine coupled to a torque converter, the torque converter having an input speed and an output speed, the torque converter coupled to a transmission, said computer storage medium comprising:

code for determining a speed ratio across the torque converter based on said input speed and said output speed; and code for controlling an engine torque at a preselected rate when said speed ratio is between a lower limit value and an upper limit value and when the torque converter is in an unlocked state, said lower limit value and said upper limit value are based on an operating parameter.

25. The article recited in claim 24 further comprising code for controlling an engine torque at a preselected rate when a driver actuated element position is less than a predetermined position.

* * * * *